United States Patent
Fletcher et al.

(10) Patent No.: US 7,194,663 B2
(45) Date of Patent: Mar. 20, 2007

(54) PROTECTIVE BUS INTERFACE AND METHOD

(75) Inventors: Mitchell S. Fletcher, Glendale, AZ (US); Peter G. Alejandro, Mesa, AZ (US); Randall H. Black, Glendale, AZ (US); Michael R. Gregg, Peoria, AZ (US); Victor S. Revelle, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 498 days.

(21) Appl. No.: 10/716,913

(22) Filed: Nov. 18, 2003

(65) Prior Publication Data

US 2005/0120275 A1  Jun. 2, 2005

(51) Int. Cl.
*G06F 11/00* (2006.01)
(52) U.S. Cl. .......................................... 714/43
(58) Field of Classification Search ................ 714/43, 714/56; 710/107, 305
See application file for complete search history.

(56) References Cited

U.S. PATENT DOCUMENTS

| | | | | |
|---|---|---|---|---|
| 4,038,644 A | * | 7/1977 | Duke et al. ................. 710/107 |
| 4,843,544 A | * | 6/1989 | DuLac et al. ................. 710/53 |
| 5,129,063 A | * | 7/1992 | Sainola et al. ................. 710/1 |
| 5,239,646 A | * | 8/1993 | Kimura ......................... 714/54 |
| 5,509,127 A | * | 4/1996 | Datwyler et al. ............ 710/311 |
| 5,608,876 A | * | 3/1997 | Cohen et al. ................ 710/300 |
| 5,608,878 A | * | 3/1997 | Arimilli et al. ............ 710/107 |
| 5,724,609 A | * | 3/1998 | Hatae et al. .................. 710/22 |
| 5,729,767 A | * | 3/1998 | Jones et al. .................. 710/62 |
| 5,764,929 A | * | 6/1998 | Kelley et al. ................ 710/107 |
| 5,796,964 A | * | 8/1998 | Bass et al. ................... 710/305 |
| 5,815,647 A | * | 9/1998 | Buckland et al. .............. 714/3 |
| 5,856,921 A | * | 1/1999 | Kim et al. ...................... 700/3 |
| 5,915,104 A | * | 6/1999 | Miller ........................ 710/310 |
| 5,978,937 A | * | 11/1999 | Miyamori et al. ............ 714/45 |
| 5,978,938 A | * | 11/1999 | Kaiser et al. ................. 714/48 |
| 5,991,900 A | * | 11/1999 | Garnett ........................ 714/56 |
| 6,134,623 A |   | 10/2000 | Garcia et al. |

(Continued)

OTHER PUBLICATIONS

Wuudiann Ke, Duy Le, Najmi T. Jarwala: A Secure Data Transmission Scheme for 1149.1 Backplane Test Bus. ITC 1995: 789-796.*

(Continued)

*Primary Examiner*—Bryce P. Bonzo
(74) *Attorney, Agent, or Firm*—Ingrassia Fisher & Lorenz

(57) ABSTRACT

Method and apparatus are provided for preventing faulty commercial-off-the-shelf (COTS) peripherals or I/Os from disabling the bus to which they are connected. The apparatus has isolators coupled to the bus and the I/Os. A controller is coupled between the interfaces, a processor and memory, operating such that an I/O cannot transfer data to the bus without permission from the bus. Isolation memory keeps I/O and bus messages separate. I/O messages are checked before being sent to the bus. The method comprises: determining if there is a message for the peripheral, temporarily storing the message, determining if the message is for output or input, and if for output, sending it to the peripheral, and if for input, requesting and receiving it from the peripheral, temporarily storing and checking it, and transferring it to the bus only if valid. This prevents a failed I/O or peripheral from disabling the bus.

18 Claims, 9 Drawing Sheets

U.S. PATENT DOCUMENTS

| | | | | |
|---|---|---|---|---|
| 6,141,718 | A | * | 10/2000 | Garnett et al. ............... 710/308 |
| 6,145,044 | A | * | 11/2000 | Ogura ........................ 710/311 |
| 6,148,348 | A | * | 11/2000 | Garnett et al. ................ 710/14 |
| 6,173,351 | B1 | * | 1/2001 | Garnett et al. .............. 710/309 |
| 6,223,230 | B1 | * | 4/2001 | Garnett et al. ................ 710/26 |
| 6,240,476 | B1 | * | 5/2001 | Garcia et al. ............... 710/302 |
| 6,341,334 | B1 | * | 1/2002 | Kamemaru ................. 711/137 |
| 6,438,639 | B1 | * | 8/2002 | Bakke et al. ............... 710/302 |
| 2003/0093746 | A1 | * | 5/2003 | Kang et al. ................. 714/774 |
| 2003/0221140 | A1 | * | 11/2003 | Bakke et al. ................ 714/25 |
| 2004/0139269 | A1 | * | 7/2004 | Nakamura .................. 710/310 |
| 2006/0085692 | A1 | * | 4/2006 | Berbaum et al. ............. 714/43 |

OTHER PUBLICATIONS

Chan, S.; Huy Luong; Charlan, W.; Fukuhara, R.; Homberg, E.; Jones, P.; Pixler, G.: The implementation of a COTS based fault tolerant avionics bus architecture. 2000. pp. 297-305 vol. 7.*

PCT International Search Report: PCT/US2004/036901, Applicant Reference No. H0004377-5709, Aug. 17, 2005, EP International Search Authority, 6 pages.

* cited by examiner

PROTECTIVE BUS INTERFACE AND METHOD

TECHNICAL FIELD

The present invention generally relates to interfaces between various portions of an electronic data system, and more particularly relates to protective bus interfaces and methods therefore.

BACKGROUND

It is common in the electronic arts to use buses to interconnect various portions of an electronic system. In general a bus comprises one or more conductors (electrical or optical) along which digital signals are carried from one part of an electronic system to another, according to specific protocols defined by the system and bus architecture. For example, in computers, avionics, and other computer based instrumentation and control systems, a "back-plane" bus is often used.

FIG. 1 is a simplified electrical schematic diagram of a prior art electronic system 10 employing a back-plane bus 12. System 10 has a single board computer (SBC) 14, communication interface 16, I/O control 18, power supply 20, and mass memory 22. These elements, enclosed within outline 24, and referred to collectively as electronic sub-system 24, are coupled to back-plane bus 12 via leads or buses 13, 15, 17, 19, 21, respectively. Back-plane bus 12 allows the various elements of electronic sub-system 24 to communicate with each other and with various interface units 26-1 through 26-N, designated as I/O-1 through I/O-N. I/O units 26-1 through 26-N are coupled to peripheral subsystems 1 through N (identified as 36-1 through 36-N), via leads or buses 37-1 through 37-N.

FIG. 2 is a simplified schematic diagram of further electronic system 30 according to the prior art. System 30 has electronic system portion 24 with analogous elements 12, 14, 16, 20, 22 and coupling buses or leads 13, 15, 17, 19, 21 equivalent to those shown FIG. 1 and identified by like reference numbers. However, system 30 communicates with I/O's 32-1 through 32-N via controller 18' over serial bus leads 31-1 through 31-N respectively, rather than via parallel bus 12. I/O's 32-1 through 32-N in turn communicate with subsystems 36-1 through 36-N over bus or leads 37-1 through 37-N, respectively.

The arrangements of FIG. 1 and FIG. 2 differ in that communication with I/O-1 to I/O-N and thus to subsystem-1 to subsystem-N, occurs in a different manner. Back-plane bus 12 of system 10 which carries signals to I/O-1 to I/O-N in FIG. 1 is generally a parallel bus, that is, each digit in a digital word flowing along the bus is generally carried by a separate lead or wire in the bus. For example, if the digital word used by system 10 has 16 bits, there will ordinarily be at least that many leads in bus 12. An advantage of prior art system 10 is that the parallel back-plane bus arrangement is comparatively fast, since digital data is carried in parallel on bus 12 to I/O-1 to I/O-N. However, a disadvantage of the arrangement of system 10 of FIG. 1 is that an electrical or logical failure in any of I/O-1 to I/O-N can shut down the entire system if it disables bus 12. For example, suppose that the $J^{th}$ I/O port I/O-J, where $1 \leq J \leq N$, suffers a logical or electrical failure and begins to "babble", that is send unwanted information to bus 12 when it should otherwise be silent. This has the effect of potentially tying up bus 12 so that sub-system 24 is prevented from communicating with any other I/O and vice versa.

In contrast, while system 30 of FIG. 2 uses back-plane bus 12 within sub-system 24, it communicates with peripherals I/O-1 to I/O-N via serial leads 31-1 through 31-N. With serial leads or serial busses, fewer leads are employed and the bits in a digital word are typically sent sequentially in time, one after the other along the same wires or fibers, rather than all at the same time on multiple parallel leads as in system 10. The arrangement of FIG. 2 has the advantage that a logical or electrical fault in any of I/O-1 through I/O-N does not disrupt communication to the remainder of I/O-1 through I/O-N. All other things being equal, this substantially increases the electronic communication reliability within system 30 as compared to system 10. The price paid for improved reliability is generally poorer speed performance. All other things being equal, sending the bits of a digital word along a single lead or lead pair, one bit after the other, takes longer than sending the bits in parallel along a parallel (e.g., back-plane) bus. Another disadvantage of the serial bus is that there are generally not as many choices of I/O devices available for serial bus systems.

FIG. 3 is a simplified electrical schematic block diagram of prior art electronic system 40 showing a protective bus isolation arrangement utilizing custom isolator and I/O components 50-1 through 50-N. Electronic controller 24 comprising elements 14, 16, 18, 20, 22 of FIGS. 1–2 communicates with back-plane bus 12 over bus 23 equivalent to buses 13, 15, 17, 19, 21 of FIGS. 1–2. Back-plane bus 12 is a parallel bus to facilitate high-speed operation. Back-plane bus 12 communicates with interface elements 50, (e.g., 50-1 through 50-N) via buses 47 (e.g., buses 47-1 through 47-N) respectively. Elements 50 comprise a bus isolator 501 (e.g., 501-1 through 501-N) and custom I/O 502 (e.g., 502-1 through 502-N). Bus isolators 501 pass any messages originated by sub-system 24 through I/O devices 502 to subsystems 36 (e.g., 36-1 through 36-N), respectively, and pass legitimate responses therefrom back to sub-system 24 while preventing failure of one or more peripherals 36 from tying up bus 12. While this arrangement works to some extent, it generally requires that I/O units 502 be custom designed for each subsystem 36, bus isolator 501 and bus 12. There is little or no interchangeability, that is, peripheral subsystems 36-1 through 36-N cannot, in general, be swapped among interface units 50. Custom designed isolator units 501 are often required. The need for custom designs significantly increases the initial and ongoing cost of overall system 40. Most importantly, advantage cannot easily be taken of the many commercially available I/O elements and peripheral subsystems that do not provide for bus isolation. In addition, failures within an individual isolator and/or its associated custom I/O can still prevent bus 12 from communicating with other peripherals or preclude other peripherals from communicating with bus 12. Thus, prior art system 40 is only a partial and undesirably costly solution to the problem of providing high speed and fault-tolerant bus-peripheral interfaces.

Accordingly, it is desirable to provide a bus communication interface and method with the speed attributes resembling a parallel bus arrangement and the bus reliability usually found in serial bus arrangements. In addition, it is desirable to implement the bus interface in such a way that industry standard elements, boards, subsystems and peripherals may be employed in so far as possible, rather than having to custom design each I/O for different peripherals. Furthermore, other desirable features and characteristics of the present invention will become apparent from the subsequent detailed description and the appended claims, taken in conjunction with the accompanying drawings and the foregoing technical field and background.

BRIEF SUMMARY

Method and apparatus are provided for preventing potentially faulty commercial peripherals and/or I/Os from disabling the bus to which they are connected. In one exemplary embodiment, a bus isolation apparatus includes a target interface coupled to the bus and a master interface coupled to the I/Os. A controller is coupled between the interfaces and to a processing element and memory. These elements cooperate so that an I/O cannot transfer data to the bus without permission from the bus. Dual port memory or other isolation memory keeps I/O and bus messages separate. I/O messages are checked before being sent to the bus and if faulty, not transferred to the bus. This prevents a faulty peripheral or I/O from disabling the bus to the detriment of the other peripherals and I/Os sharing the bus.

In another exemplary embodiment, a method includes the steps of determining if there is a message for the peripheral, temporarily storing the message, determining if the message is for output or input, and if for output, sending it to the peripheral, and if for input, requesting and receiving the input from the peripheral, temporarily storing and checking it, and transferring it to the bus only if valid. This prevents a failed I/O or peripheral from disabling the bus. If any of the intermediate checking steps fail, an error indicator is desirably set.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. For convenience of description, FIGS. 4–FIG. 7 are described in terms of a system used in flight vehicles, e.g., for use in connection with avionics systems, but this is not intended to be limiting. Persons of skill in the art will understand based on the description herein that the present invention applies to any type of electronic system with a processing core (e.g., but not limited to sub-system 24 of FIGS. 1–3) that needs to reliably communicate with various peripheral subsystems 1 through N via I/O ports I/O-1 . . . I/O-J . . . I/O-N, where $1 \leq J \leq N$.

Figure 1:
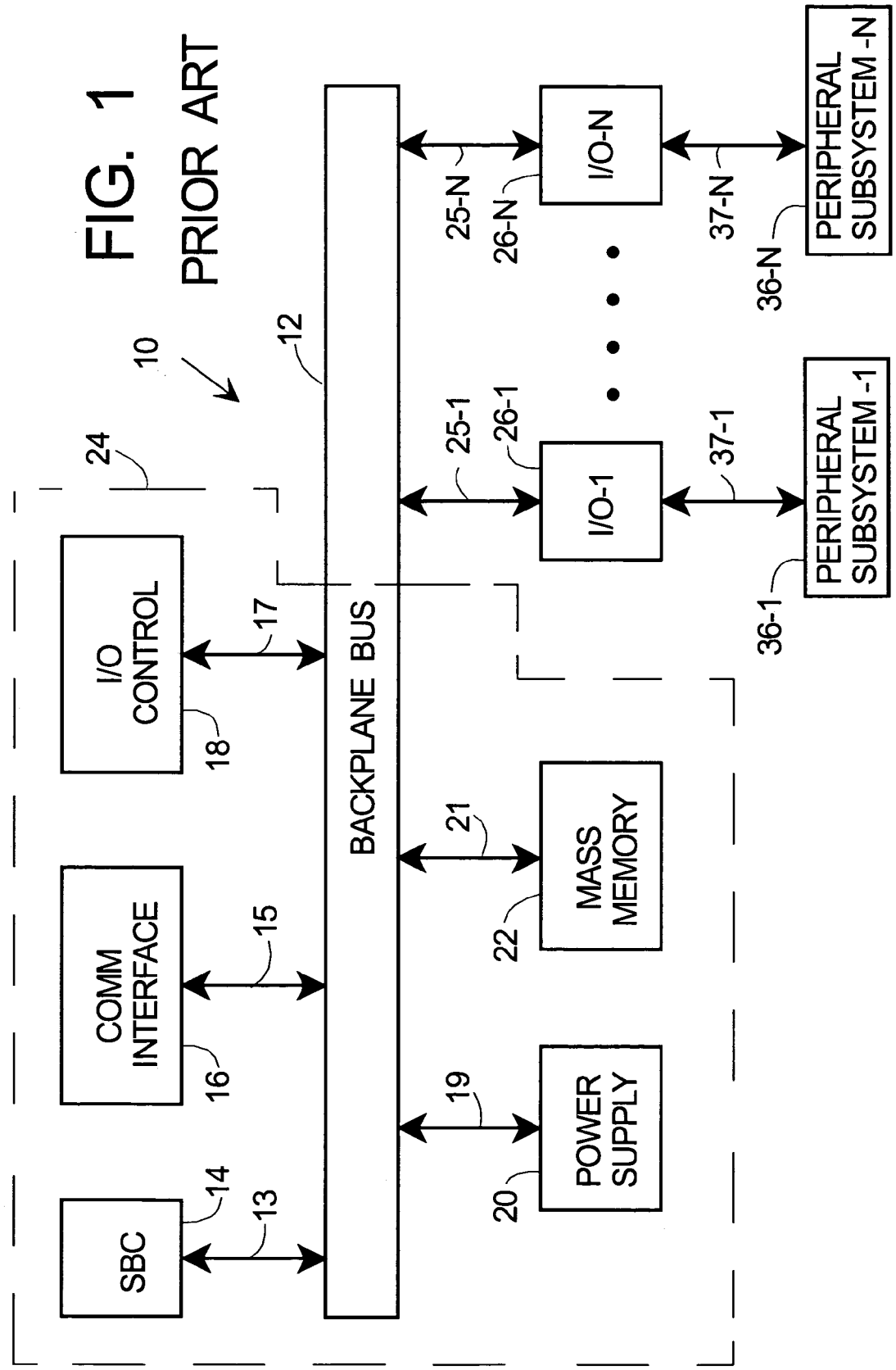
FIG. 1 is a simplified electrical schematic block diagram of a prior art electronic system communicating with multiple I/O's, according to a first embodiment.
Figure 2:
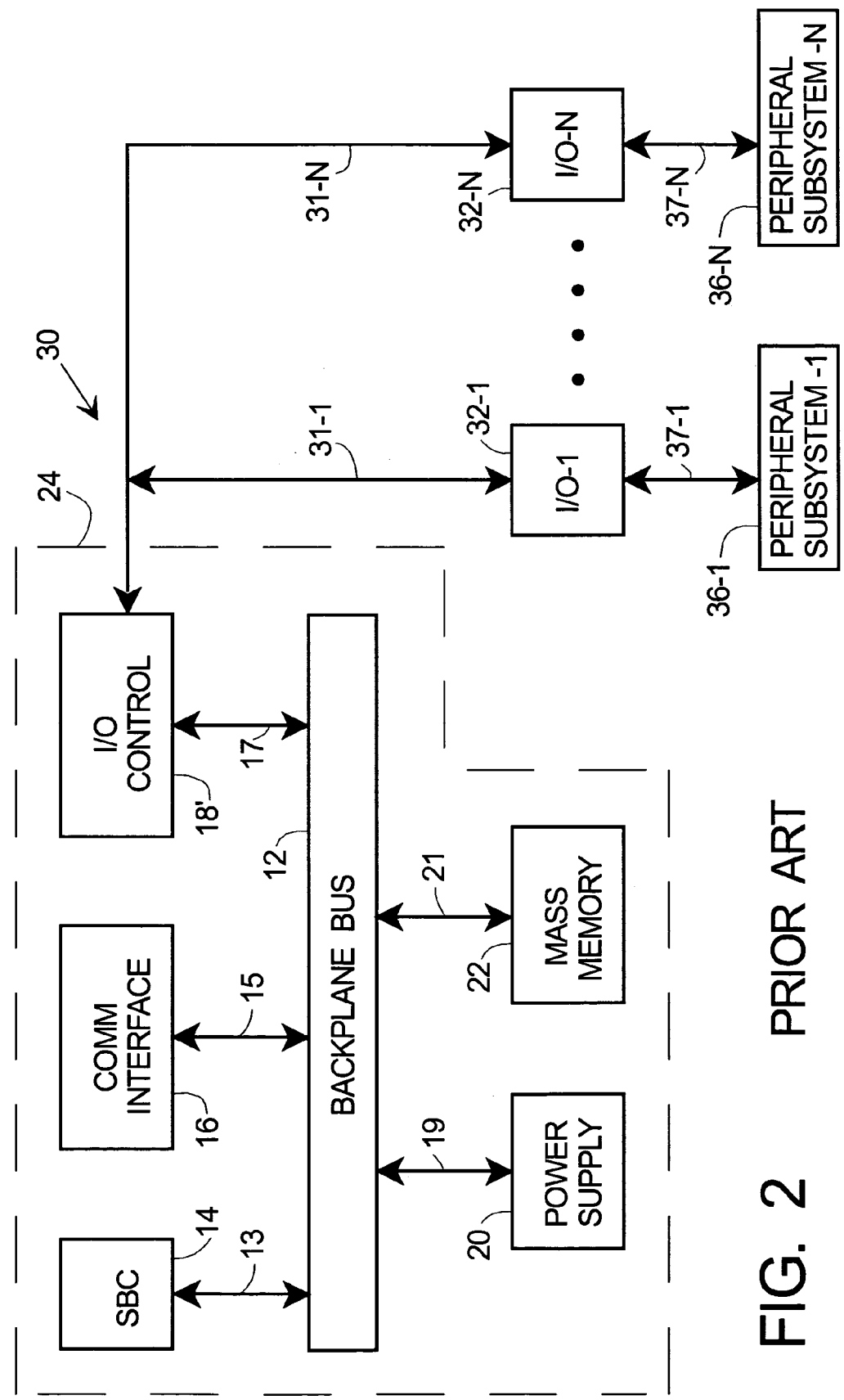
FIG. 2 is a simplified electrical schematic block diagram of a prior art electronic system communicating with multiple I/O's, but according to a different embodiment.
Figure 3:
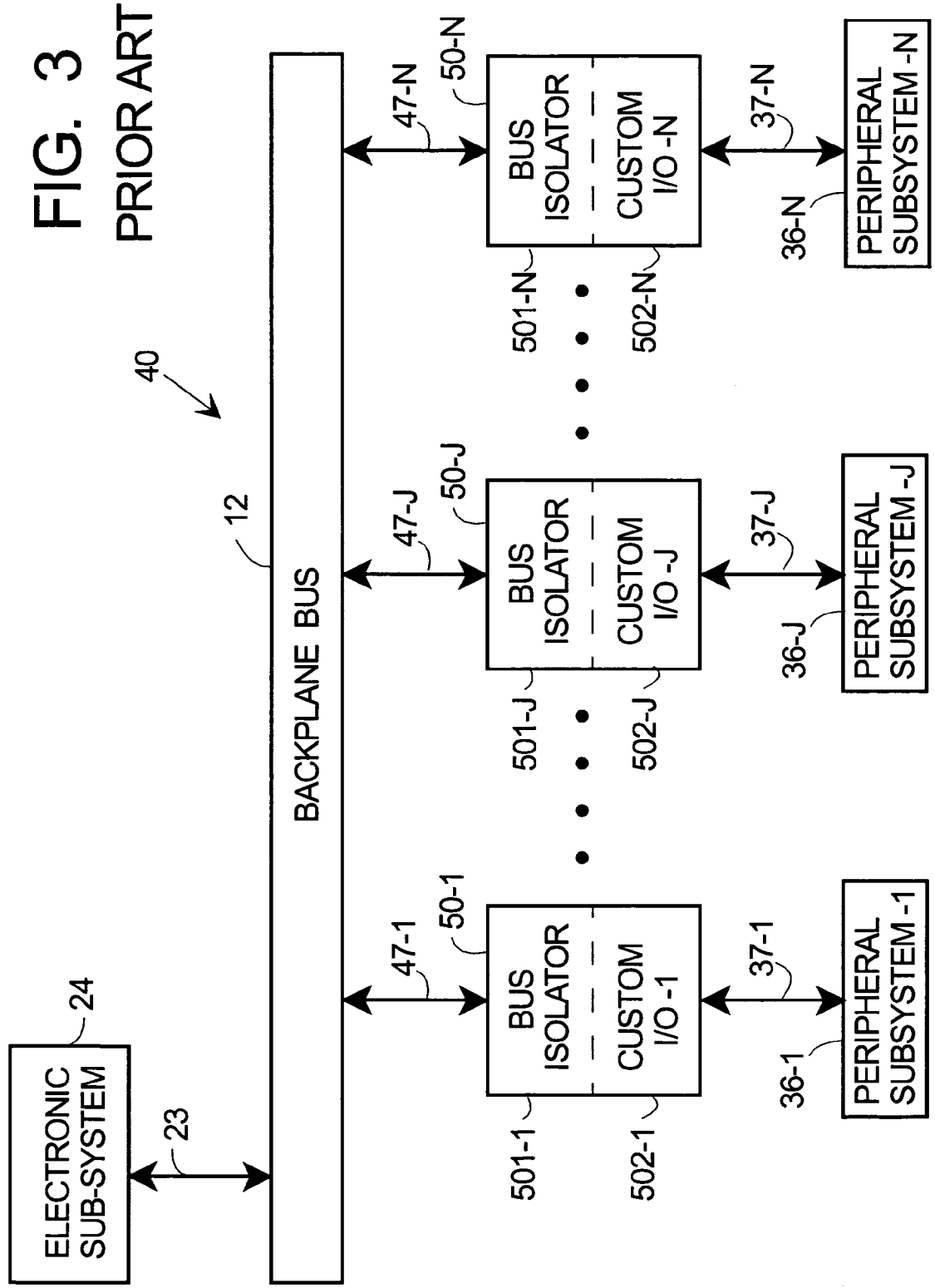
FIG. 3 is a simplified electrical schematic block diagram of a prior art electronic system illustrating a bus isolation arrangement utilizing custom I/O elements.
Figure 4:
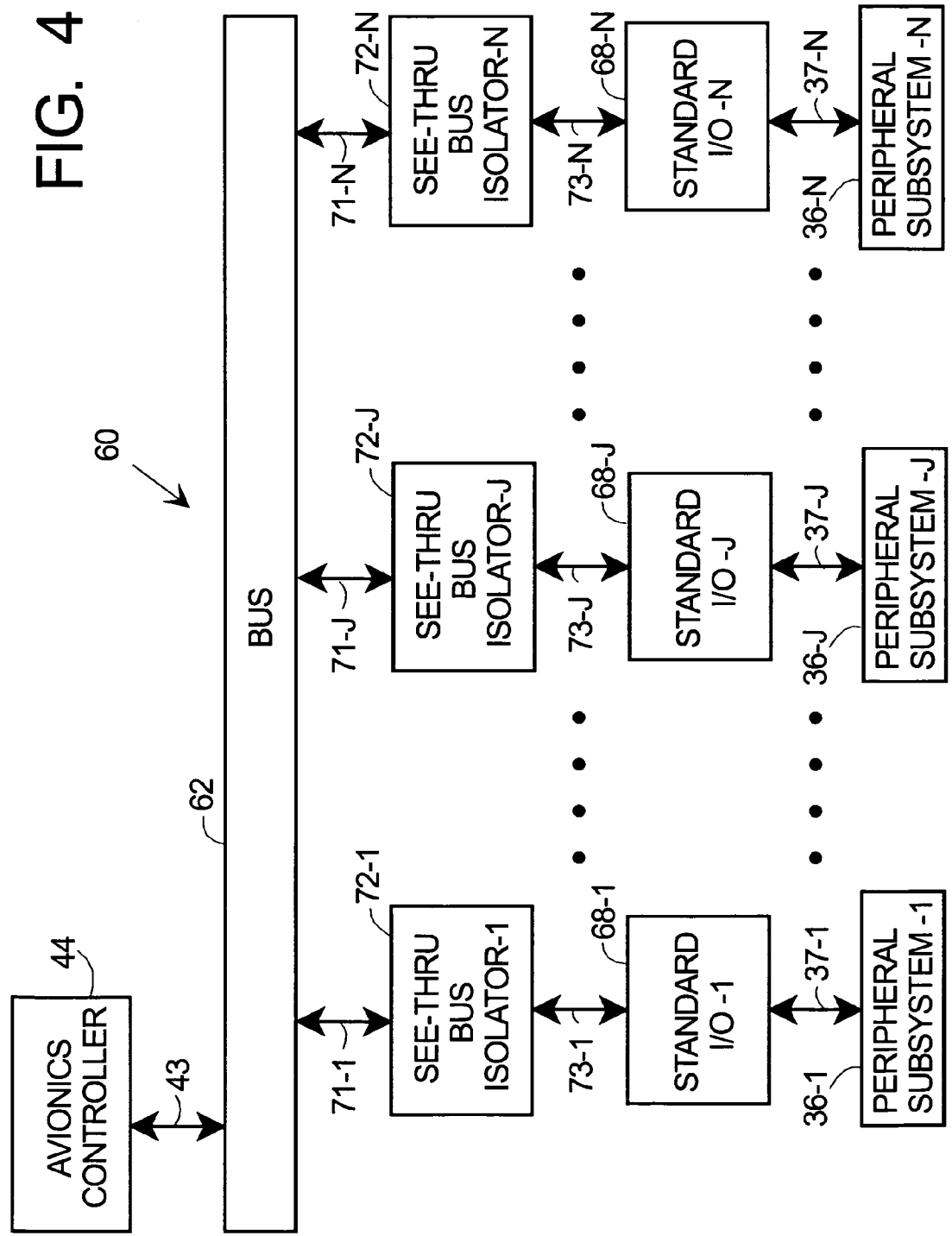
FIG. 4 is a simplified electrical schematic block diagram of a protective bus isolation arrangement able to use standard bus and I/O elements, according to the present invention.

Referring now to FIG. 4, avionics controller 44 in FIGS. 4–7 is analogous to electronic sub-system 24, avionics bus 62 is analogous to back-plane bus 12, and bus 43 coupling avionics controller 44 to avionics bus 62 is equivalent to bus 23 illustrated in connection with FIGS. 1–3. It does not matter exactly what type of processing or control is being provided by avionics controller 44. The present invention is concerned with how avionics controller 44 can reliably and efficiently communicate with vehicle subsystems 36-1 through 36-N using standard I/O's, in so far as possible. While only three peripheral subsystems 36-1, 36-J, 36-N are shown, this is merely for convenience of explanation and persons of skill in the art will understand that any number of peripheral subsystems (e.g., "peripherals") can be utilized with the present invention. As used herein the designation 36-J or 36J is intended to refer to the $J^{th}$ peripheral subsystem where $1 \leq J \leq N$. The same convention is used in referring to the $J^{th}$ bus isolator, the $J^{th}$ I/O, etc.

FIG. 4 is a simplified electrical schematic block diagram of protective bus isolation arrangement 60, able to use standard bus 62 and standard I/O elements 68-1 through 68-N according to the present invention. Avionics controller 44 communicates, for example, with standard back-plane bus 62 via bus 43. Avionics controller 44, bus 43, and I/O elements 68-1 through 68-N are conventional, commercial off-the-shelf (COTS) elements, though these components could be non-conventional. Bus 62 can be any one of numerous types of buses. In the preferred embodiment, bus 62 is chosen from among buses having predefined architecture and signaling protocols, for example but not limited to, PCI, CPCI, IDE, VME, AGP, ARINC buses, etc., for which standard elements and peripherals are commercially available. Bus 62 is ordinarily a back-plane bus within an electronics system, e.g., within an electronic "box" or "module", but other types of buses with other functions are not precluded. I/O units 68-1 through 68-N are also preferably but not necessarily, COTS units, that is, Standard Commercial Off-The-Shelf units having predefined architecture and signaling protocols. Busses 73-1 through 73-N can be any one of numerous types of buses. In the preferred embodiment, busses 73-1 through 73-N are chosen from among buses having predefined architecture and signaling protocols, for example but not limited to, PCI CPCI, IDE, VME, AGP, ARINC buses, etc., for which standard elements and peripherals are commercially available. The term SEE-THRU bus interface or bus isolator for elements 72 is appropriate and will be understandable to those skilled in the art based on the description herein. The terms SEE-THRU bus interface or SEE-THRU bus isolator are intended to include the situation where buses 62 and 73 are the same or different. While use of the same bus standard on both of buses 62, 73 separated by SEE-THRU isolators 72 is convenient, this is not essential. SEE-THRU bus isolators 72-1 through 72-N isolate I/O units 68-1 through 68-N from bus 62, so that a fault on any of I/O units 68-1 through 68-N and/or their respective peripheral subsystems 36-1 through 36-N, does not cripple bus 62 and prevent correct operation of the other I/O's and peripheral subsystems coupled to the bus.

The difference between system 40 of FIG. 3 and system 60 FIG. 4 is that SEE THRU isolators 72 of system 60 permit standard COTS I/O's 68 (and corresponding peripheral subsystems 36) to be coupled to bus 62 without having to design a custom interface or use custom I/O's. This can achieve great cost saving and significantly lower overall development time. In a first example, initial prototypes for proof of concept testing and software development can be built using COTS I/O components hanging directly on bus 62 without SEE-THRU isolators 72. Development of SEE-THRU isolators 72 can proceed in parallel with system development. Then, when proof of concept testing is complete, SEE-THRU isolators 72 can be inserted between each I/O 68 and bus 62 so that each I/O 68 and peripheral subsystem 36 is isolated from others on bus 62 to achieve greater system reliability. In a second example, initial prototypes for proof of concept testing and software development can be built using COTS I/O components with SEE-THRU isolators 72 isolating them from bus 62. This permits early evaluation of the fault tolerance as well as the performance of the system. Then, when proof of concept testing is complete, custom I/O's and isolation interfaces (e.g., as in FIG. 3) can be substituted for the SEE-THRU isolator plus COTS I/O combination when it is desired to minimize weight and power consumption or provide other capability (e.g., radiation resistance) not available in COTS components. Thus, it becomes possible to achieve greater system reliability at much lower development cost and shorter development time with no sacrifice in system performance. These are significant advantages.

Figure 5:
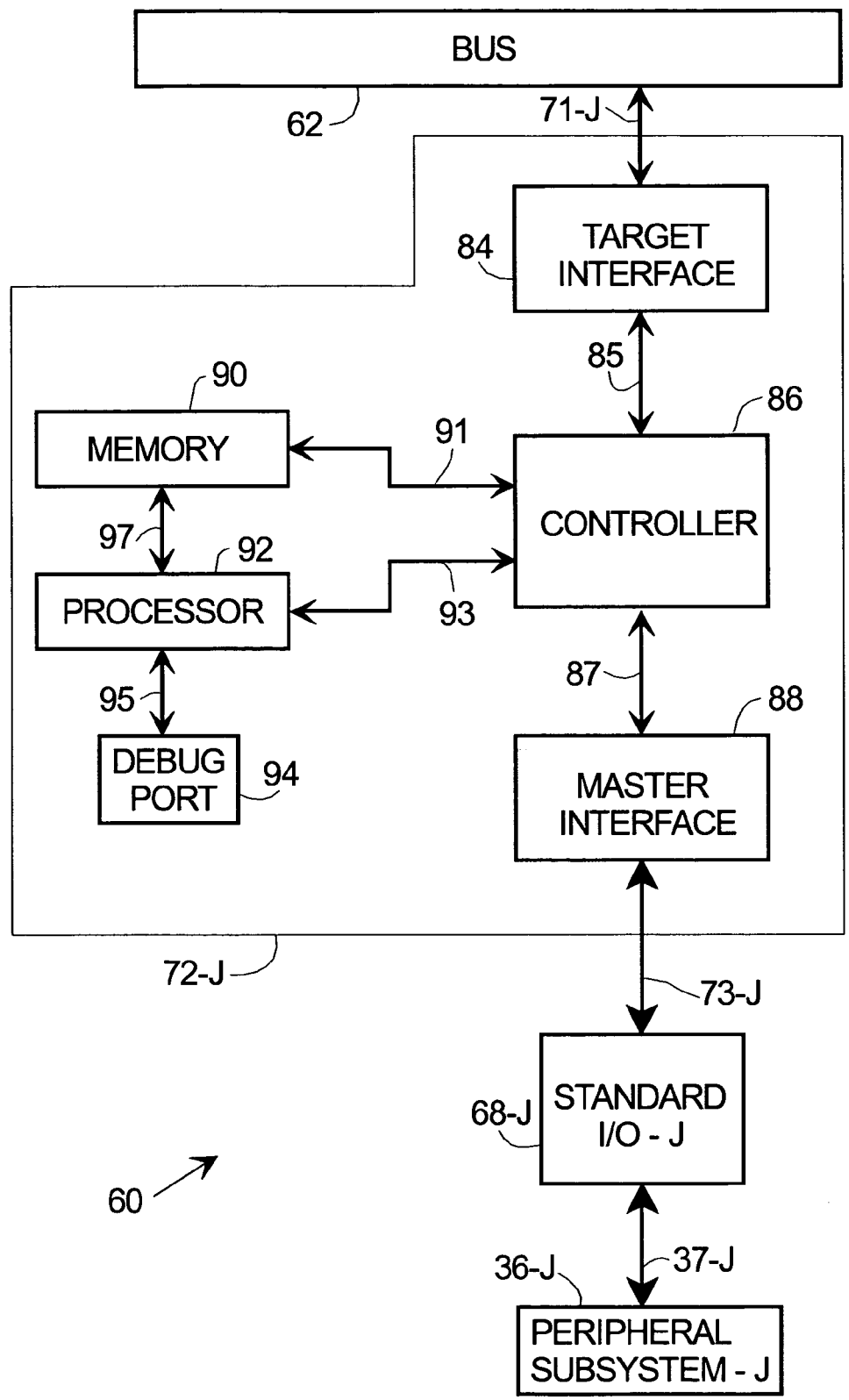
FIG. 5 is a simplified electrical schematic block diagram of the protective bus isolation arrangement of FIG. 4, showing further details according to a first embodiment.

FIG. 5 is a simplified electrical schematic block diagram of system 60 of FIG. 4, showing further details of SEE-THRU isolator 72-J, according to a first embodiment of the present invention for a single standard I/O 68-J and associated peripheral subsystem 36-J. For simplicity, controller 44 is omitted in FIGS. 5–7 but persons of skill in the art will understand that it or an equivalent controller is or can be coupled to bus 62. For entire system 60, J identical copies of isolator 72 would be used to implement isolators 72-1 through 72-J for each type of bus 73-J present in the system. Thus, several configurations of isolators 72-J may be used in the same system 60 to accommodate different types of buses 73-J and/or I/Os 68-J that need to be accommodated.

Isolator 72 uses two interfaces 84, 88. Interface 84 couples isolator 72-J to bus 62 via bus or connection 71-J. Interface 88 couples isolator 72-J to COTS I/O 68-J via bus or connection 73-J. Interfaces 84, 88 are commercially available, for example, from Actel Corporation of Sunnyvale, Calif., in the form of designs that can be implemented in a field programmable gate array (FPGA) for quick prototyping, incorporated into a custom or semi-custom ASIC design, or purchased as commercially available components. These pre-designed elements insure that the signaling protocols, architecture and timing needed by the bus and the I/O are met for standard buses and I/O configurations. Although a person skilled in the art of bus interface implementation can create a unique implementation that meets the standardized protocol and timing of a documented bus, purchase of an available design can greatly simplify development. Persons of skill in the art will understand how to incorporate commercially available designs into the invention as described herein.

Data and/or messages from bus 62 and I/O 68-J are coupled from interface units 84, 88 to controller 86 via buses or connections 85, 87 respectively. Controller 86 is coupled to memory 90 and processing element (processor) 92 via buses or connections 91, 93 respectively. Processor 92 can be, but is not limited to, a state machine, a simple controller, microprocessor, or digital signal processor (DSP). It is desirable but not essential that memory 90 communicates directly with processor 92 via bus or connection 97. In the preferred embodiment debug port 94 is provided and conveniently coupled to processor 92 by bus or connection 95, but this is not essential. In general, avionics bus interface 84 is referred to as the "target" or "slave" interface and standard I/O interface 88 is referred to as the "master" interface. A master interface has the capability to initiate a request for data while a target or slave interface does not. A target or slave interface is only capable of responding to a data request or message from a master interface and cannot by itself initiate a data transfer across the bus-I/O interconnection. As used in this embodiment, the master for bus 62 is contained in avionics controller 44 and the target is target interface 84 within isolator 72-J. Interface 88 is the master for bus 73-J and the target for bus 73-J is contained within Standard I/O 68-J. With this arrangement, the only way either slave or target can request a transfer is to have a prearranged scheme whereby the master polls the I/O card and asks if there is any information that it wishes to transfer. Avionics controller 44 on bus 62 is the controller for bus 62 and master interface 88 is the controller for bus 73-J. Other arrangements of the bus master and slave or target are possible depending on the level of protection that is desired within the target system and the needs of the particular system. Persons of skill in the art will understand how to adapt to the needs of their particular system.

In this embodiment, data or a message is received by target interface 84 from avionics bus 62 and moved by controller 86 to memory 90. Processor 92 decodes the message information stored in memory 90 and acts upon it to pass it along to COTS I/O interface 68. There are two types of transfer, output and input, which can be requested by the message information sent to memory 90. Each request to either output data or input data is initiated, for example, by avionics controller 44 via avionics bus 62. The sequence used to determine if an output or input is commanded is illustrated in more detail in the method of FIG. 8, which will be discussed further below.

Figure 8A:
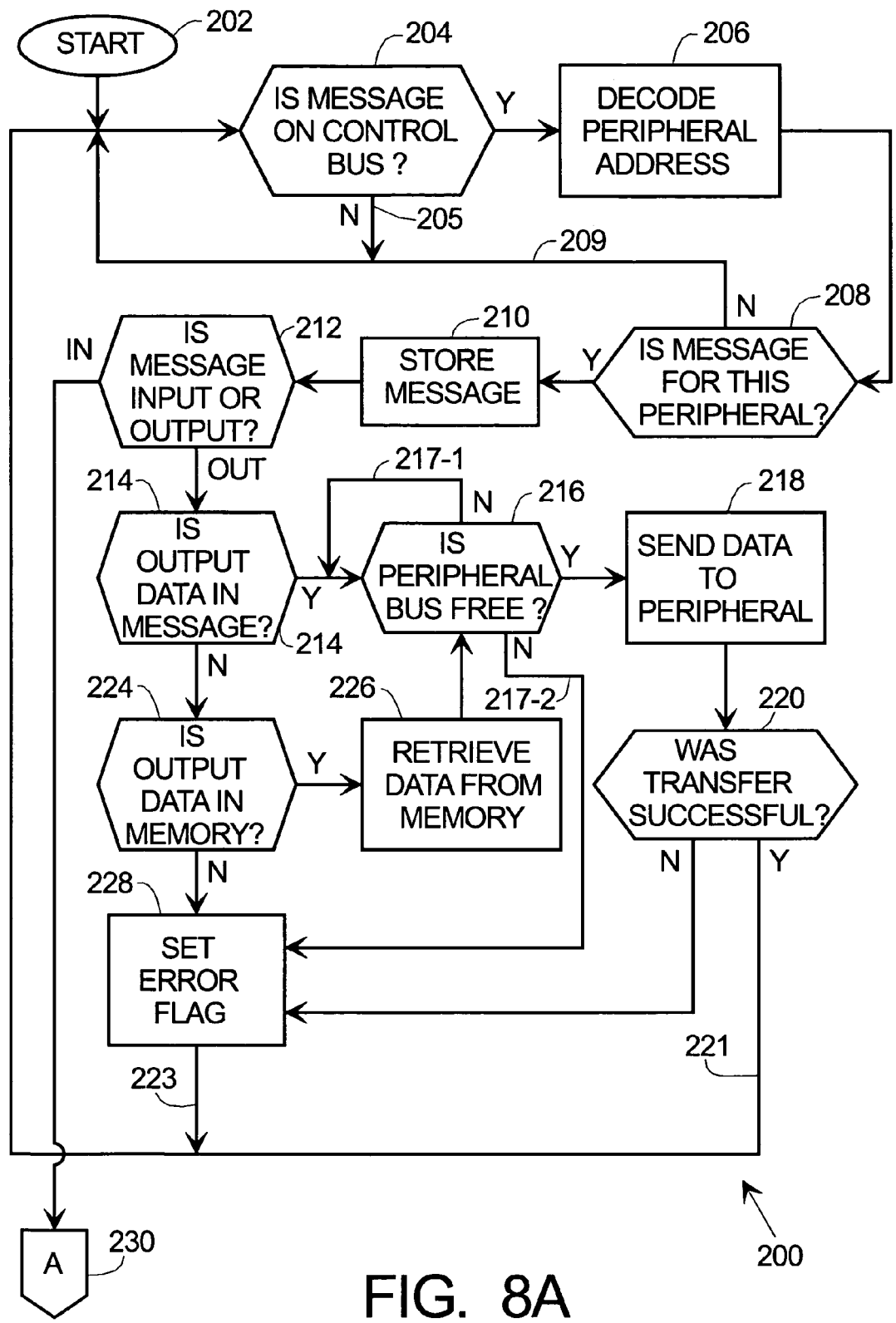
FIGS. 8A and 8B are simplified flow charts illustrating the method of the present invention.

If the data request and information intended for I/O 68 is to be output to subsystem 36, then processor 92 moves the associated data from memory 90 to master interface 88 in accordance with the protocol requirements of bus 73. The detailed flow of data for the output case is illustrated in more detail in the method of FIG. 8A. The method illustrated in FIG. 8A is an example and not intended to be limiting. Persons of skill in the art will understand based on the description herein that there are many variations that can be used.

Figure 8B:
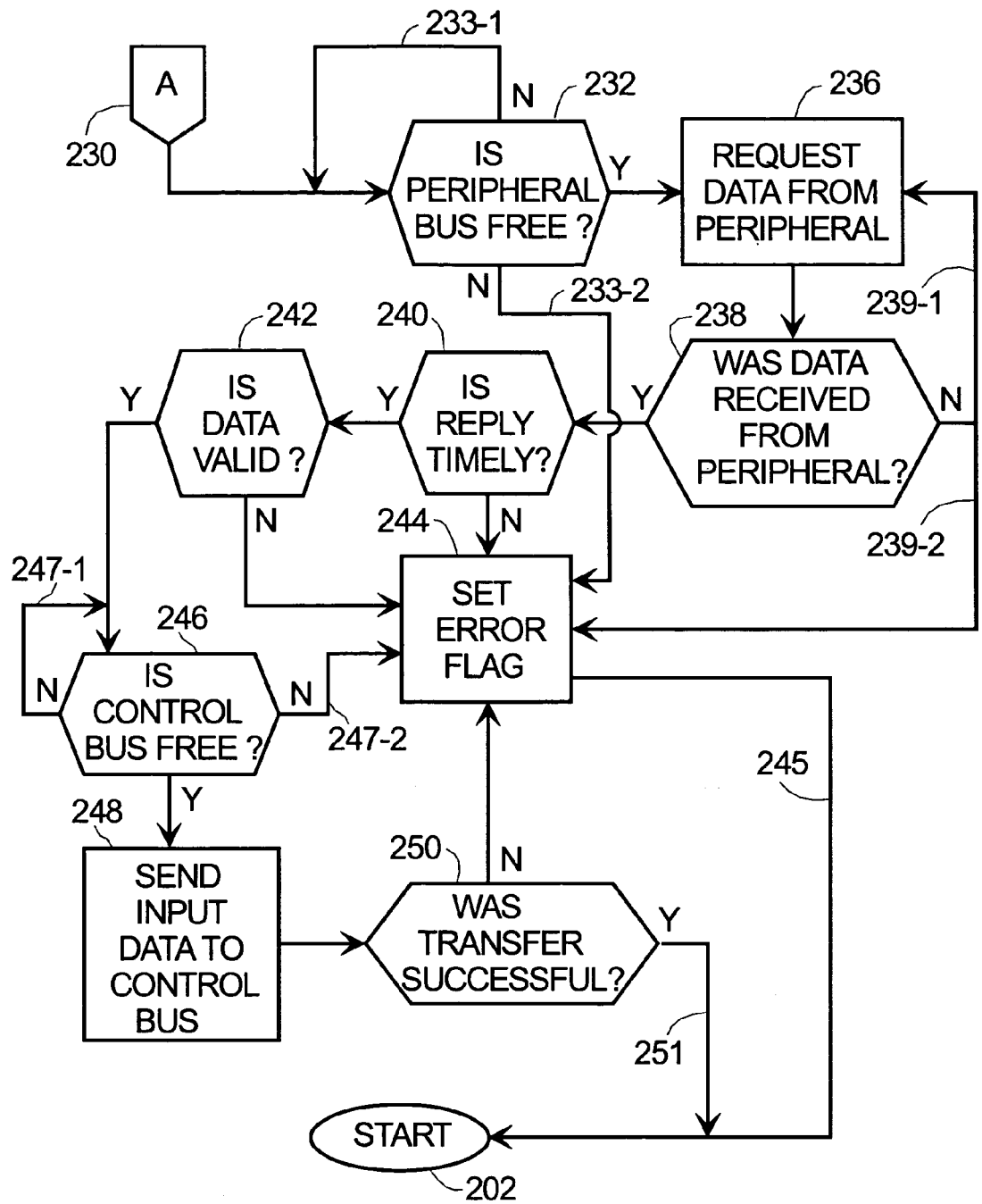

For an input message, data can only be returned from COTS side I/O interface 88 by a command from processor 92 via controller 86. When a request for data is received from avionics controller 44 via bus 62, processor 92 instructs controller 86 to have master interface 88 request the desired data from standard I/O 68-J through peripheral interface bus 73-J. Return data is received by COTS side interface 88 and transferred via controller 86 to memory 90. If the data is valid (e.g., has the correct format, etc.) and has been requested by avionics controller 44 (see FIG. 4) via bus 62, then processor 90 first enables controller 86 and commands controller 86 to pass the data to bus 62 and avionics controller 44. If the data that has flowed into memory 90 from COTS side interface 88 is not valid or has not been requested by bus 62, then it is not transferred to bus 62. Isolator 72 will only transfer data from I/O 68-J and peripheral subsystem 36-J when commanded to do so by avionics controller 44 via bus 62 and not otherwise. Thus, system 60 is fail-isolated, that is, a failure of a particular I/O 68-J and/or peripheral subsystem 36-J does not lock-up bus 62. If the function of peripheral subsystem 36-J and I/O 68-J is such that it needs to periodically send data to avionics controller 44 via bus 62, then such data is received as requested by interface 88 and transferred by controller 86 into memory 90 where it is retained until polled by controller 44 via bus 62. Thus, essential data is still available but is transferred to bus 62 only in response to a command from bus 62 and not otherwise. The detailed flow of data for the input case is illustrated in the method of FIG. 8B. The method illustrated in FIG. 8B is an example and not intended to be limiting. Persons of skill in the art will understand based on the description herein that there are many variations that can be used.

An alternative to the direct input scenario previously described is to have system 60 acquire I/O data from standard I/O 68-J on a predetermined periodic basis. In this case, processor 92 would periodically send an input data request to master interface 88 to acquire data from standard I/O 68-J. When the data is returned, controller 86 would move the data from bus 73-J and store it in memory 90 in a pre-arranged location. Thereafter subsystem 36 can send a command to read the pre-acquired data. When this command is received by target interface 84, processor 92 reads memory 90 and causes the response to be sent to bus 62 via target interface 84 whenever it requires the data.

Figure 6:
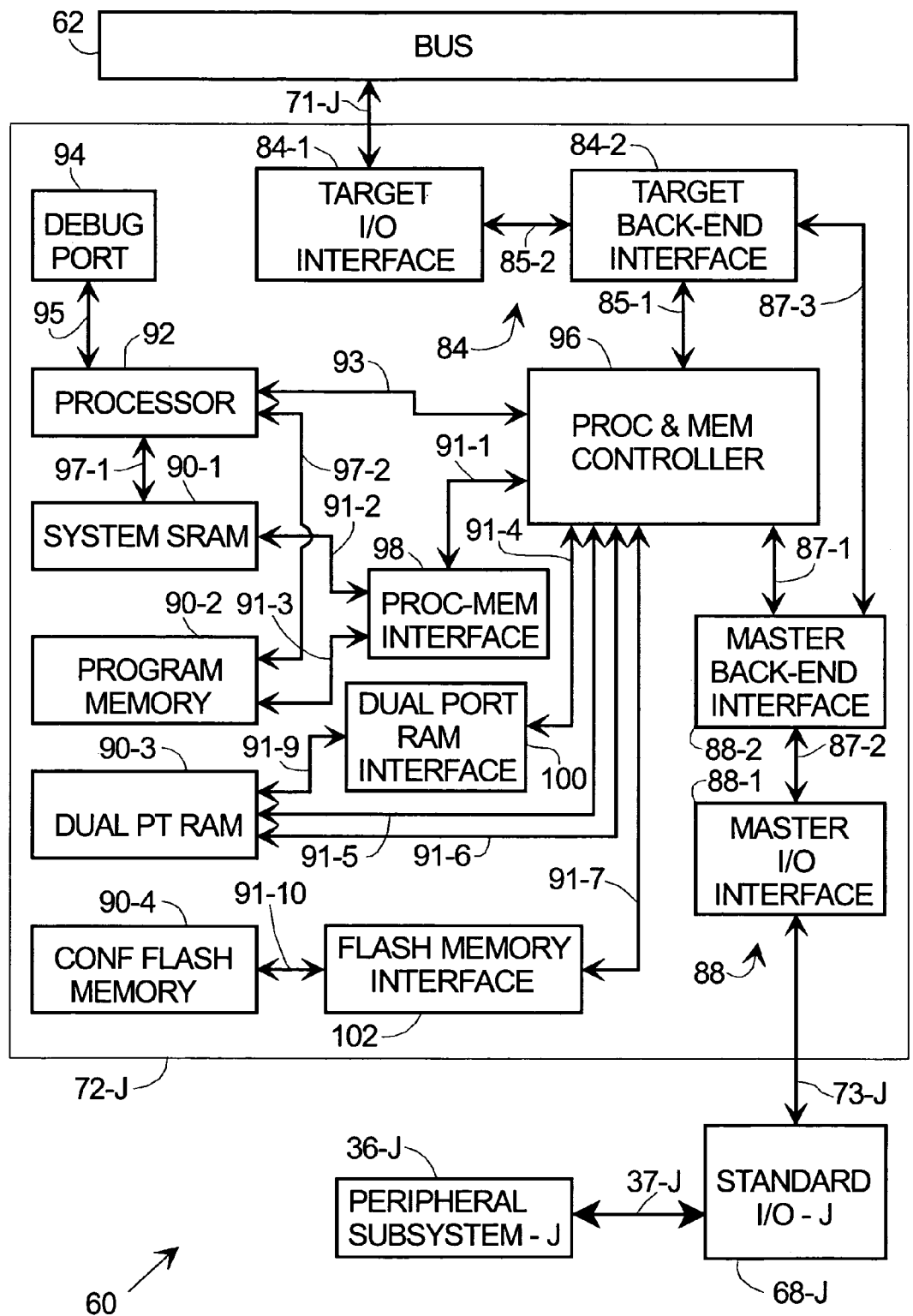
FIG. 6 is a simplified electrical schematic block diagram of the protective bus isolation arrangement of FIG. 5 showing still further details.

FIG. 6 is a simplified electrical schematic block diagram of system 60 illustrating protective SEE-THRU bus isolator 72-J of FIG. 5 in still further detail. Target interface module 84 is desirably partitioned into target I/O interface 84-1 and target back-end interface 84-2. It is portion 84-1 that is most easily obtained as a standard commercial design as discussed in connection with interface 84 of FIG. 5. Target back-end interface 84-2 is desirably provided for any required signal translation between the output of target I/O interface 84-1 and controller 96. Target I/O interface 84-1 is coupled to bus 62 by bus or connection 71-J and to target back-end interface 84-2 by connection or bus 85-2 which is, in turn, coupled to controller 96 via bus or connection 85-1. Master interface module 88 is desirably partitioned into master I/O interface 88-1 and master back-end interface 88-2. It is portion 88-1 that is most easily obtained as a standard commercial IP design as discussed in connection with interface 88 of FIG. 5. Master back-end interface 88-2 is provided for any required signal translation between the output of master I/O interface 88-1 and controller 96. Master I/O interface 88-1 is coupled by bus or connection 73-J to I/O 68-J and by connection or bus 87-2 to master back-end interface 88-2 that is, in turn, coupled to controller 96 via bus or connection 87-1. Master back-end interface 88-2 is also desirably but not essentially coupled around controller 96 to target back-end interface 88-2 by leads or bus 87-3. This connection is conveniently used for initialization and test. Upon power-up, registers within interface 88 should be initialized and having connection 87-3 from controller 44 to interface 88 via bus 62 and interface 84 is preferred since it can make this task more straight forward, but this is not essential.

Processor and memory controller 96 is analogous to controller 86 of FIG. 5 and is coupled to processor 92 by bus or connection 93 as has been previously explained. Memory 90 of FIG. 5 is illustrated in FIG. 6 as being partitioned into system RAM 90-1, program memory 90-2, dual port RAM memory 90-3 and configuration flash memory 90-4. Processor 92 is desirably coupled to system RAM 90-1 by bus or connection 97-1 and to program memory 90-2 by bus or connection 97-2. Program memory 90-2 conveniently stores the operating program for processor 92. System RAM, 90-1, is useful as a scratch pad memory for processor 92. Configuration flash memory (CFM) 90-4 conveniently stores the configuration of standard I/O 68-J in dual port RAM memory 90-3. CFM 90-4 can be read by processor 92 and read and written to by controller 44 via bus 62, interface 84, controller 96, and CFM memory interface 102. Dual Port or isolation RAM 90-3 is the temporary memory into which each side of the interface reads and writes command and data. Elements of the system coupled by SEE-THU isolator 72-J only can access one side of the dual port or isolation RAM. This arrangement conveniently provides failure isolation while allowing valid commands and data to be transferred across SEE-THRU interface 72-J. Dual port RAM is convenient, but persons of skill in the art will understand based on the description herein that other types of isolation RAM may also be used. As used herein, the words "dual port" RAM are intended to include such alternative types of isolation RAM.

Bus or connection 91-1 couples processor and memory controller 96 to processor-memory interface circuit 98, which is in turn coupled to system RAM 90-1 and program memory 90-2 via buses or connections 91-2 and 91-3, respectively. Processor-Memory interface 98 provides separate memory control signals for system RAM 90-1 and program memory 90-2. Processor-Memory interface 98 allows processor 92 to access program memory 90-2 for execution. It also conveniently allows avionics controller 44 to program the function of SEE-THRU isolator 72-J on first installation (or upgrade). Controller 96 is coupled to dual port or isolation RAM 90-3 over buses or connections 91-4, 91-9 via dual port or isolation RAM interface 100 and directly via buses or connections 91-5, 91-6 (direct memory access connections). RAM interface 100 conveniently provides separate memory control signals for both sides of RAM 90-3. As such, it allows for control of dual port RAM 90-3 through separate address and data busses 91-5 and 91-6 from/to dual port RAM 90-3. The function of the dual-port or isolation RAM 90-3 is to provide temporary storage for the input and output data that will be moved to, from or between commercial I/O 68-J and bus 62 coupled to avionics controller 44. Controller 96 is also desirably coupled to configuration flash memory 90-4 over buses or leads 91-7, 91-10 via flash memory interface 102. Flash memory interface 102 provides separate memory control signals and interface to control flash memory 90-4. The purpose of the flash memory 90-4 is to hold the current configuration of SEE-THRU bus isolator 72-J (e.g., the interface bus configuration and signaling protocol requirements).

The following is an example of the operation of system 60 of FIG. 6. For simplicity, the suffix "J" indicating an individual subsystem is omitted here.

A request for data is generated by controller 44 and passed to bus 62 via leads or bus 43 (see FIG. 4).

SEE-THRU bus isolator (STBI) 72 receives the request message from 62 via coupling bus 71.

Within SEE THRU bus isolator (STBI) 72, interface 84 receives the request and verifies proper message protocol (e.g., timing, parity, etc.). If the protocol is incorrect then an error is generated and the transaction is aborted. If the protocol is correct then interface 84 sends the request to controller 96 via coupling bus 85.

Controller 96 sends the request message to memory interface 100, which sends the request message to be stored in dual port RAM 90-3. The message is usually more than a single digital word. It is generally many words that describe all of the relevant parameters of the request and any accompanying data.

Processor 92 polls the command lists in dual port RAM 90-3 for new commands carried by the received message. When a new command is found it acts on it. It verifies proper command protocol and data integrity. The command is formatted for the appropriate COTS bus protocol and sent to controller 96 via bus or leads 93.

Controller 96 sends the command to interface 88 to be transmitted to I/O 68 via coupling bus 73. I/O 68 acts on the command and either transmits data to peripheral 36 or receives data from peripheral 36 depending on the type of command. If it receives data from peripheral 36 via bus 37, then I/O 68 sends the received data to interface 88 via bus 73.

Interface 88 sends the data to controller 96, which sends it to dual port RAM interface 100 and then stores it in dual port RAM 90-3. This is all under the control of processor 92.

At some later time controller 44 will read dual port RAM 90-3 via the same process as above to get the received data.

STBI 72 does not care if the data is accurate or not as long as it is valid data, that is conforms to the proper protocol. It is up to the controlling system to decide if the data is accurate. STBI 72 will not let any hardware/software problems within I/O 68, peripheral 36 or bus 73 interfere with the operation of bus 62. This way other equipment on the bus 62 can still operate.

Figure 7:
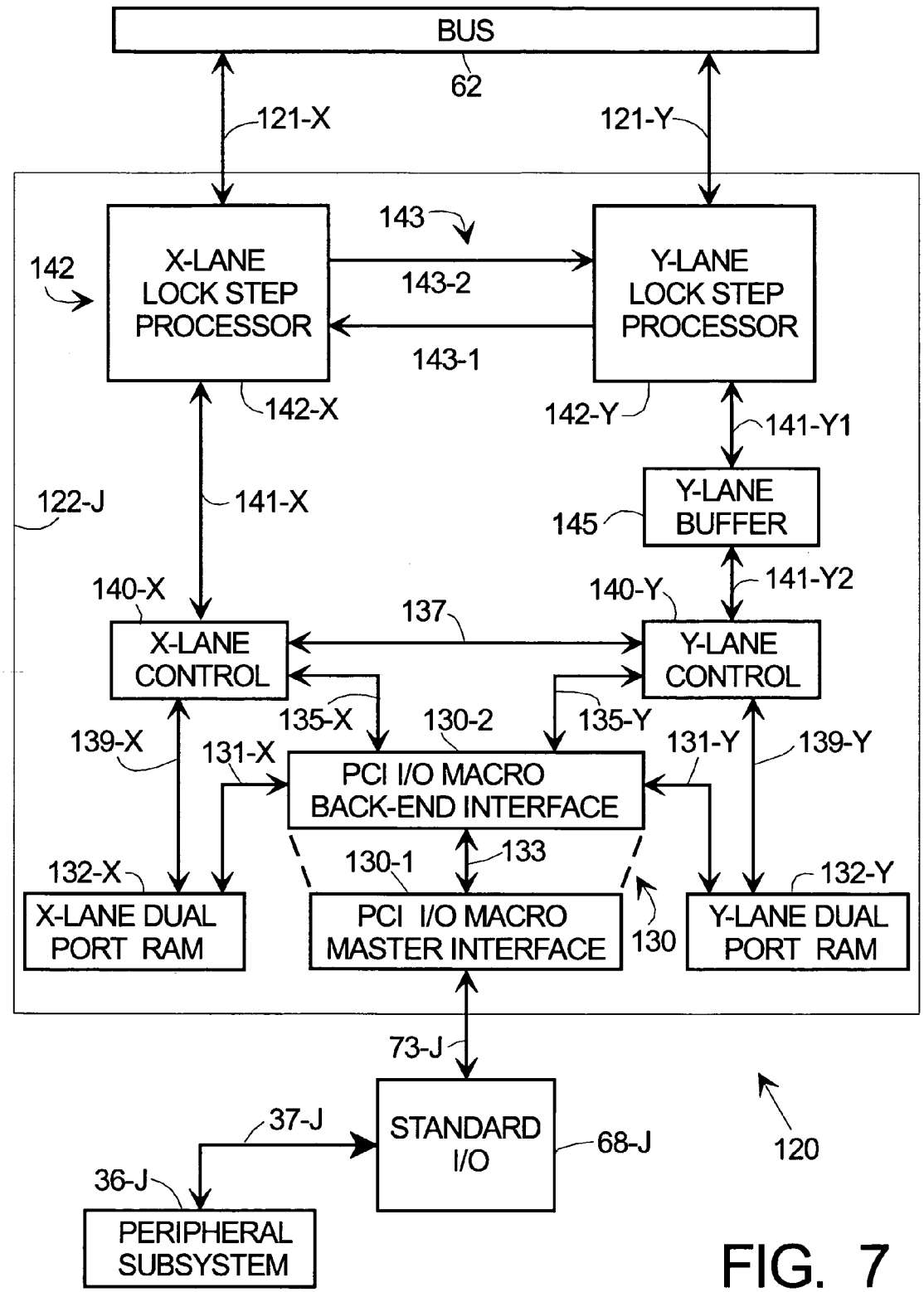
FIG. 7 is a simplified electrical schematic block diagram of the protective bus isolation arrangement of FIG. 4 but showing further details according to a second embodiment.

FIG. 7 is a simplified electrical schematic block diagram of system 120 employing protective SEE-THRU bus isolator 122-J analogous to bus isolator 72-J of FIGS. 4–6 but according to a still further embodiment. Isolator 122-J has the advantage that the function of avionics controller 44 can be integrated within bus isolator 122-J. This capability is provided by lock step processors 142. This improvement can reduce the cost of the overall system by eliminating separate avionics controller 44. In addition the avionics controller function can itself be made fail-safe by the use of lock step processing. However, absorption of the functions of avionics controller 44 (see FIG. 4) into lock-step processors 142 is not essential, and overall system operation may continue to use avionics controller 44 or equivalent.

For convenience of explanation, system 120 is described in terms of protectively interfacing bus 62 to peripheral subsystem 36-J via standard I/O 68-J, the latter elements having been previously described in connection with FIG. 6. In this illustration bus 62 is, for example, an ARINC 659 bus, but this is not intended to be limiting. The ARINC 659 bus is a well-known standard bus whose technical specification is maintained by ARINC of Annapolis, Md. and to which many available standard subsystems may be coupled. Isolator 122-J employs two lock-step processors, X-lane lock step processor 142-X and Y-lane lock step processor 142-Y, which are coupled to bus 62 by leads or buses 121-X and 121-Y, respectively. (The ARINC 659 bus provides separate X and Y lane signal paths.) Lock-step processors are well known in the art and are designed such that as each instruction is executed by the X-lane processor, an identical companion instruction is executed by the Y-lane processor.

To keep the two processors in synchronization (i.e., in "lock-step") the register state and/or result of each program step are exchanged over interconnecting leads or buses 143-1 and 143-2, respectively. If the corresponding lock-step program steps do not agree, then execution is halted and data flow stopped. This provides "fail-isolated" operation for the isolator 122-J in addition to any processing carried out in place of avionics processor 44.

Referring now to the bottom of FIG. 7, peripheral subsystem 36-J is coupled to isolator 122-J via bus or leads 37-J, standard I/O 68-J and bus or leads 73-J, in much the same manner as have been previously described in connection with FIGS. 4–6. Bus 73-J couples to interface 130, preferably having master I/O macro interface 130-1 analogous to interface 88-1 and back-end interface 130-2 analogous to interface 88-2 (see FIG. 6). In FIG. 7, interface 130-1 is illustrated as being a PCI I/O master macro, that is, a master interface designed to interface to bus 73-J, which in this example is assumed to be a PCI bus. Interface 130-1 is referred to as a "macro" because it is available as a macro circuit that may be implemented in a programmable gate array (PGA). This gate array macro is the same or similar to interface 88-1 of FIG. 6 and can be purchased from such companies as Actel Corporation of Sunnyvale, Calif. Interface 130-1 is coupled to PCI macro back-end interface 130-2 via bus or leads 133. While FIG. 7 shows interface 130 as being compatible with a PCI bus (in this case bus 73-J is assumed to be a PCI bus), persons of skill in the art will understand that any standard (or custom) bus configuration may be used and interface 130 chosen accordingly. Interface 130 must be compatible with the particular peripheral interface chosen. Non-limiting examples of such interfaces are: PCI, CPCI, VME, AGP, IDE, etc. This interface can be implemented not only with parallel buses, but also serial buses. Non-limiting examples of suitable serial buses are USB, Firewire (IEEE-1394), etc.

PCI I/O macro back-end interface 130-2 is coupled to X-lane dual port RAM 132-X via bus or leads 131-X and to Y-lane dual port RAM 132-Y via bus or leads 131-Y. Dual port RAMs 132-X, 132-Y are coupled to corresponding X and Y-lane controls 140-X, 140-Y by buses or leads 139-X, 139-Y. PCI macro back-end interface 130-2 is coupled to X-lane control 140-X via bus or leads 135-X and to Y-lane control 140-Y via bus or leads 135-Y. X-lane and Y-lane controls 140-X and 140-Y are cross-coupled by bus or leads 137. The data presented through bus or connections 137 compares the commands/data from the two sides of X-lane controller 140-X and Y-lane controller 140-Y to verify that they are continuously performing the same operation(s). The information on buses or leads 141-X and 141-Y should be the same or interface 122-J will not let the commands proceed through to bus 73-J or bus 62. X and Y-lane controls 140-X, 140-Y are coupled to respective X and Y-lane lock-step processors 142-X, 142-Y; in the X-lane by interconnection bus or leads 141-X and in the Y-lane via leads 141-Y1 and 141-Y2 via Y-lane buffer 145. Buffer 145 provides isolation of the two sides. Two lanes or sides of a redundant system preferably do not connect to a single component in order to maintain one-fault tolerant operation. It is not important in which lane or side the buffer is located. The X and Y sides or lanes are identical and buffer 145 can be placed in either side. Persons of skill in the art will understand that lock-step processors 142 can include memory, interface modules and test ports of various types such as are illustrated, for example, in system 60 of FIG. 6.

The operation of SEE-THRU buffer 122-J of FIG. 7 will now be described. A request to output or input data can come from either bus 62 (or a controller coupled to bus 62), or from software operating in lockstep processors 142-X and 142-Y within isolator 122-J. For purposes of this discussion, it is assumed that the request comes via bus 62. From bus 62, also called the "control" bus, the request is sent via interface bus 121 to lock-step processors 142. The request is compared between the two lock-step processor sides via cross-coupled leads or buses 143-1 and 143-2 and if the requests are different the transaction is halted. If the requests are the same the process continues. Lock-step processors 142 format the request and transmit it to X and Y lane controllers 140-X and 140-Y respectively via busses 141-X, and 141-Y1, 141-Y2. The integrity of the two sides of the lock-step system is protected through buffer 145. Buffer 145 is an isolation buffer to isolate the two sides from directly interfacing to controllers 140-X and 140-Y. The output or input request is stored in dual port RAMs 132-X and 132-Y via busses or connection 139-X and 139-Y under the control of X and Y lane controllers 140-X and 140-Y, respectively.

If the data request and information intended for I/O 68-J is to be output to subsystem 36-J, then X-lane controller 140-X and Y-lane controller 140-Y simultaneously move data to back end interface 130-2 from memory 132 and to master interface 130-1. The data is output in accordance with the requirements of the chosen bus protocol (in this case assumed to be PCI) through interface bus 73-J only if the data from X and Y channel dual port memories 132-X and 132-Y are identical. For convenience of explanation, bus 73-J is also referred to as the "peripheral" bus since it couples isolator 122-J to peripheral subsystem 36-J through standard I/O 68-J. The flow of data for the output case is shown in more detail in FIG. 8A and for the input case in FIG. 8B. As noted previously, the methods of FIGS. 8A–B are merely one of many variations that will occur to those of skill in the art based on the description herein.

If the command is a request for input data from peripheral subsystem 36-J then a configuration command is stored in dual port RAMs 132-X, 132-Y by the lock-step processors 142-X, 142-Y. X-lane controller 140-X and Y-lane controller 140-Y simultaneously command back-end interface 130-2 and PCI master interface 130-1 to request data from commercial I/O 68-J by sending the appropriate command over peripheral bus 73-J. The configuration command stored in dual port RAMs 132-X, 132-Y is transferred to interface 130 via buses or leads 131-X, 131-Y. The commands stored in dual port RAMs 132-X, 132-Y are compared by X and Y lane controllers 140-X, 140-Y via cross-coupling bus or leads 137 and if they do not match then the transaction is aborted. If they match the requested command is sent to commercial I/O 68-J via bus 73-J. The data externally presented to commercial I/O 68-J from the subsystem 36-J via connection 37-J is sent to (e.g., PCI) bus 73-J in accordance with the input protocol for inputting PCI commands. PCI interface 130-1 receives the data and sends the data to the dual-port RAMs 132-X, 132-Y under control of X and Y lane controllers 140-X, 140-Y through the back-end controller 130-2 via connections 131-X, 131-Y. When requested by the lock-step processors 142-X, 142-Y, X and Y lane controllers 140-X, 140-Y simultaneously retrieve the data from dual-port RAMs 132-X and 132-Y and send the data to control bus 62, and thence to whatever subsystem (not shown) coupled to bus 62 that has need thereof.

FIGS. 8A and 8B are a simplified flow charts illustrating method 200 according to the present invention. FIG. 8B is a continuation of FIG. 8A. Referring now to FIG. 8A, beginning with start 202 which conveniently can occur on power-up, query 204 is executed in which SEE-THRU bus isolator (STBI) 72-J or 122-J determines whether a message of the appropriate format is present on the control bus (e.g., bus 62) to which STBI 72-J or 122-J is coupled. The message may originate with controller 44 or equivalent. The message is usually more than a single digital word. It is generally many words that describe all of the relevant parameters of the request and any accompanying data. If the outcome of query 204 is NO (FALSE) then method 200 returns to query 204 as indicated by pathway 205. If the outcome of query 204 is YES (TRUE) then in subsequent step 206, the peripheral address is decoded and the result passed to query 208 in which it is determined whether the address corresponds to the address of peripheral 36-J to which STBI 72-J or 122-J is coupled. If the outcome of query 208 is NO (FALSE) then method 200 returns to query 204 as illustrated by pathway 209. If the outcome of query 208 is YES (TRUE) then in step 210, the message is stored in memory, as for example, memory 90 or 132. While the sequence of FIG. 8A is preferred with respect to store step 210, those of skill in the art will understand that store step 210 can be performed before or after either of steps 206 or 208. Either arrangement is useful.

Query 212 is then executed wherein it is determined whether or not the message is for data INPUT or data OUTPUT, that is data being requested from peripheral 36-J (INPUT DATA) or data being sent to peripheral 36-J (OUTPUT DATA). As used herein with respect to messages being passed in either direction through STBI 72-J or 122-J, the term "data" (either upper case or lower case) is intended in a general sense to include any form of digital communication, including but not limited to commands, instructions and information of any kind. FIG. 8A illustrates steps associated with OUTPUT data and FIG. 8B illustrates steps associated with INPUT data, however this is not intended to be limiting. If the output of query 212 is INPUT (abbreviated in FIG. 8A as "IN) then method 200 proceeds via "A" to the steps illustrated in FIG. 8B. If the outcome of query 212 is OUTPUT (abbreviated in FIG. 8A as "OUT"), then method 200 proceeds to query 214 wherein it is determined whether or not the OUTPUT DATA is included in the message. If the outcome of query 214 is YES (TRUE) then method 200 proceeds to query 216 wherein it is determined whether or not the peripheral bus, for example, bus 73-J, is free. If the outcome of query 216 is NO (FALSE) then method 200 loops back as illustrated by path 217-1 until query 216 yields YES (TRUE). As indicated by line 217-2 running to SET ERROR FLAG step 228, one or more error flag(s) may also be set indicating that the bus is or is still busy. This error flag may be optionally set after the first or any predetermined number of NO (FALSE) outcomes of query 216, but this is not essential.

If the outcome of query 216 is YES (TRUE) then in step 218 the message data is sent to designated peripheral 36-J via bus 73-J, I/O 68-J, and coupling bus 37-J. In the preferred embodiment, query 220 is executed to determine whether or not the data transfer to peripheral 36-J was successful. Persons of skill in the art will understand how such verification may be accomplished. However, verification step 220 is not essential. If the outcome of query 220 is NO (FALSE) then an error flag is set in step 228. If the outcome of query 220 is YES (TRUE) then method 200 loops back via path 221 and query 204 is repeated.

Returning now to step 214, if the outcome of query 214 is NO (FALSE) then query 224 is carried out wherein it is determined whether or not the OUTPUT data is already stored in memory (e.g., memory 90 or 132), for example at some other location than the stored message location. If the outcome of query 224 is NO (FALSE) then method 200 proceeds to step 228 wherein an error flag is set. If the outcome of query 224 is YES (TRUE) then in step 226, the OUTPUT data is retrieved from memory and control passes to step 216. Subsequent operation is as has been already described. Persons of skill in the art will understand that the error flags set in step 228 can be different depending upon which query yielded a NO (FALSE) result. The error flag (or flags) are conveniently stored in memory within STBI 72-J or 122-J and can be sent to control bus 62 (and controller 44) in response to a polling inquiry from bus 62 or otherwise as determined by the designer. For maximum reliability, it is preferred that error flags be reported in response to a poll from bus 62. Persons of skill in the art will understand that there are various methods of indicating an error condition and the use of error flags in the description herein is intend merely to be exemplary and not limiting.

Returning now to query 212 where the outcome of query 212 is INPUT (abbreviated "IN"), method 200 proceeds via path [A] at 230 to FIG. 8B. Referring to FIG. 8B, query step 232 is executed wherein it is determined whether or not the peripheral bus (e.g., bus 73-J) is free. If the outcome of query 232 is NO (FALSE) then method 200 loops back via path 233-1 and query 232 is repeated until it yields YES (TRUE). As indicated by line 233-2 running to SET ERROR FLAG step 244, one or more error flags may also be set indicating that the bus is or is still busy. This error flag may be optionally set after the first or any predetermined number of NO (FALSE) outcomes of query 232, but this is not essential.

If the outcome of query 232 is YES (TRUE) then in step 236 the desired data is requested from peripheral 36-J via bus 73-J, I/O 68-J, and coupling bus or leads 37-J. In the preferred embodiment, query 238 is then executed to determine whether or not the data requested from peripheral 36-J was received by STBI 72-J or 122-J. Persons of skill in the art will understand how such verification may be accomplished. However, verification step 238 is not essential. If the outcome of query 238 is NO (FALSE) then method 200 loops back via path 239-1 and request step 236 is repeated until query 238 yields YES (TRUE). Persons of skill in the art will understand that a limit on the number of loop backs may be provided. As indicated by line 239-2 running to SET ERROR FLAG step 244, one or more error flags may also be set indicating that the data was not received. This error flag may be optionally set after the first or any predetermined number of NO (FALSE) outcomes of query 238, but this is not essential.

If the outcome of query 238 is YES (TRUE) then queries 240, 242 are desirably executed in either order. In query 240, it is optionally determined whether or not the data received from peripheral 36-J arrived in a timely manner. This is one means of data verification since untimely data arrival can be indicative of a partial failure in peripheral 36-J or I/O 68-J. If the outcome of query 240 is NO (FALSE) indicating that the data arrival was not timely, the method 200 desirably but not essentially proceeds to SET ERROR FLAG step 244. If the outcome of query 240 is YES (TRUE) indicating that data arrival was timely, then method 200 proceeds to query 242 wherein it is determined whether or not the data received from peripheral 36-J is valid. The criteria for determining whether the data is valid will depend upon the particular system being constructed and the nature of the data. Persons of skill in the art will understand how to establish appropriate data validity criteria. Non-limiting examples, are format tests, valid content tests, parity tests, CRC checks, and check bit tests. If the outcome of query 242 is NO (FALSE) then method proceeds to SET ERROR FLAG step 244.

If the outcome of query 242 is YES (TRUE) then method 200 desirably proceeds to query 246 wherein it is determined whether or not the control side bus (e.g., bus 62) is free. IF the outcome of query 246 is NO, then method 200 loops back via path 247-1 and query 246 is repeated. Optionally, SET ERROR FLAG step 244 may also be executed via path 247-2 after the first or any number of NO (FALSE) outcomes of query 246, as has already been discussed in connection with other queries. When query 246 yields YES (TRUE) then execution proceeds to step 248 wherein the INPUT data obtained from peripheral 36-J is sent to control bus 62 (and thence to controller 44 if applicable). Then in optional query step 250, it is determined whether or not the data transfer of step 248 was successful. If the outcome of query 250 is NO (FALSE) then SET ERROR FLAG step 244 is executed. The prior comments concerning the nature, storage and reporting of such error flag(s) given in connection with FIG. 8A are incorporated herein by reference. If the outcome of query 250 is YES (TRUE) then method 200 preferably returns to START 202 as shown by path 251 and initial query 204 is repeated.

While at least two exemplary embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A bus isolator for coupling a bus of a first predetermined configuration and signaling protocol (collectively the "first properties") to a peripheral via an I/O of a second predetermined configuration and signaling protocol (collectively the "second properties"), comprising:
   a target interface coupled to the bus according to the first properties and configured to be responsive to a bus controller for transmission of data on the bus;
   a master interface coupled to the I/O according to the second properties;
   a controller coupled to and receiving signals from the target and master interfaces;
   a memory coupled to the controller for storing signals received from the bus and the I/O; and
   a processing element coupled to the controller and the memory and configured to manage the activity of the isolator and to verify the integrity of data contained in the signals received from the master interface, wherein data is transmitted from the target interface to the bus only in response to a data request from the bus controller.

2. The isolator of claim 1 wherein data requested by the bus from the I/O is sent via the master interface to the memory and the processor, where the integrity of such data is verified and only sent to the bus if of appropriate format so that a defective I/O or a defective peripheral coupled to the I/O cannot capture the bus.

3. The isolator of claim 1 wherein the I/O is a commercially available I/O such that the second properties are standard-off-the-shelf properties.

4. The isolator of claim 1 wherein the bus is a commercially available bus such that the first properties are standard off-the-shelf properties.

5. The isolator of claim 1 wherein the memory comprises an isolation memory, having a first portion wherein data is received from the target interface and a second portion where data is received from the master interface.

6. The isolator of claim 5 wherein the memory further comprises a program memory and a flash memory.

7. The isolator of claim 1 wherein the processing element comprises a state machine, a simple controller, a microprocessor, a digital signal processor or a combination of first and second lock-step processors.

8. An electronic system operating in response to a bus controller, the electronic system comprising:
   multiple peripherals;
   multiple COTS I/O elements, each coupled to one of the peripherals for passing signals to and from the one of the peripherals;
   multiple isolation elements, each coupled to at least one of the COTS I/O elements for passing signals to and from the at least one COTS I/O element;
   a bus coupled to the multiple isolation elements for sending and receiving signals to and from the peripherals via the isolation elements and the COTS I/O elements; and
   wherein each isolation element comprises:
      a target interface coupled to the bus for receiving commands from the bus controller and passing valid data requested by the bus controller from the peripheral to the bus;
      a master interface coupled to the at least one COTS I/O element for passing commands received from the bus to the peripheral and data requested from the peripheral back to the bus;
      a controller coupled to the target interface and the master interface for controlling command and data flow there between;
      a memory coupled to the controller for receiving commands and data from the bus and data from the at least one COTS I/O element; and
      a processing element coupled to the memory and the controller and configured to manage command and data flow between the bus and the at least one COTS I/O element such that the integrity of data contained in the signals received from the master interface is verified, and such that a signal from the at least one COTS I/O element is only transmitted to the bus in response to command received from the bus controller allowing such transfer.

9. The system of claim 8 wherein the memory comprises an isolation memory having one part coupled to the at least one COTS I/O element for receiving data transfer therefrom and another part coupled to the bus for receiving command and data transfer therefrom.

10. The system of claim 9 wherein the memory further comprises program memory containing programs for execution by the processor and flash memory for containing configuration data for the isolation element.

11. The system of claim 8 further comprising a debug port coupled to the processing element.

12. A method for coupling a bus and a peripheral via an isolator, comprising:
   determining whether there is a message for the peripheral;
   temporarily storing the message in the isolator;
   determining whether the message is for output to the peripheral or input from the peripheral; and
   if for output to the peripheral, sending the output to the peripheral; and
   if for input from the peripheral;
      receiving the input from the peripheral and temporarily storing it in the isolator;
      checking the input from the peripheral; and
         if valid, transferring the input from the peripheral to the bus in response to a request from a remote bus controller operating on the bus; and
         if not valid, not transferring the input from the peripheral to the bus.

13. The method of claim 12 further comprising before the first sending step, determining whether the output for the peripheral is in the message or already stored in the isolator.

14. The method of claim 13 wherein if the output for the peripheral is already in the message, further comprising determining whether a bus coupling the peripheral to the isolator is free and if free sending the output to the peripheral and if not free setting an error indicator.

15. The method of claim 13 wherein if the output for the peripheral is already stored in the isolator, further comprising retrieving the stored output and determining whether a bus coupling the peripheral to the isolator is free and if free sending the output to the peripheral and if not free setting an error indicator.

16. The method of claim 12 wherein the checking step comprises determining whether the input from the peripheral is timely and valid and if timely and valid sending the input from the peripheral to the bus and if not timely and valid setting an error indicator.

17. The method of claim 16 further comprising after the sending step, checking to see whether the sending step was successful.

18. The method of claim 12 further comprising after the transferring step, checking to see whether the transferring step was successful.

* * * * *